United States Patent [19]

Wood

[11] 4,071,451
[45] Jan. 31, 1978

[54] LIQUID FILTRATION SYSTEM

[75] Inventor: Norman E. Wood, Rochester, N.Y.

[73] Assignee: The French Co., Webster, N.Y.

[21] Appl. No.: 764,019

[22] Filed: Jan. 31, 1977

Related U.S. Application Data

[63] Continuation-in-part of Ser. No. 675,295, April 9, 1976, abandoned.

[51] Int. Cl.² .................. B01D 37/00; B01D 35/16
[52] U.S. Cl. ............................... 210/79; 210/111; 210/112; 210/168; 210/413
[58] Field of Search ............... 210/97, 109, 111, 112, 210/400, 415, 168, 171, 79

[56] References Cited

U.S. PATENT DOCUMENTS

| | | | |
|---|---|---|---|
| 3,087,620 | 4/1963 | Hias | 210/111 |
| 3,344,921 | 10/1967 | Fegan, Jr. | 210/97 X |
| 3,687,288 | 8/1972 | Lynch et al. | 210/112 X |
| 3,876,548 | 4/1975 | Wells, Jr. | 210/391 |

*Primary Examiner*—William A. Cuchlinski, Jr.
*Attorney, Agent, or Firm*—Charles S. McGuire

[57] ABSTRACT

A filtration system for removing both large, bulky and small, compactible solid contaminants from a liquid, intended primarily for the collection of chips and purifying and recycling coolant liquids used in machining and other metal working operations. Contaminanted liquid which has been used in the machining operation transports metal chips and other contaminants to a tank divided into upper and lower compartments by a wedgewire strainer. The sub-atmospheric pressure which develops in the lower compartment due to pumping of clean liquid from the lower compartment and the build-up of small, compactible contaminants on the upper side of the strainer is measured and a signal commensurate with the magnitude of the pressure provides the input to a drive motor for a continuous loop drag conveyor which scrapes the chips and sludge from the surface of the strainer. Thus, the rate of chip and sludge removal and the degree of coolant clarity is continuously and directly proportional to the degree of contaminant build-up. Also, the input signal to the drive motor has a minimum value greater than zero which is established as a function of the volumetric rate at which large, bulky contaminants, such as curly metal trunings, are supplied to the upper compartment. Although these contaminants provide very little resistance to flow through the strainer, they are nonetheless removed from the tank even at times when little or no small, compactible contaminants are present to increase the pressure differential between the upper and lower compartments.

8 Claims, 3 Drawing Figures

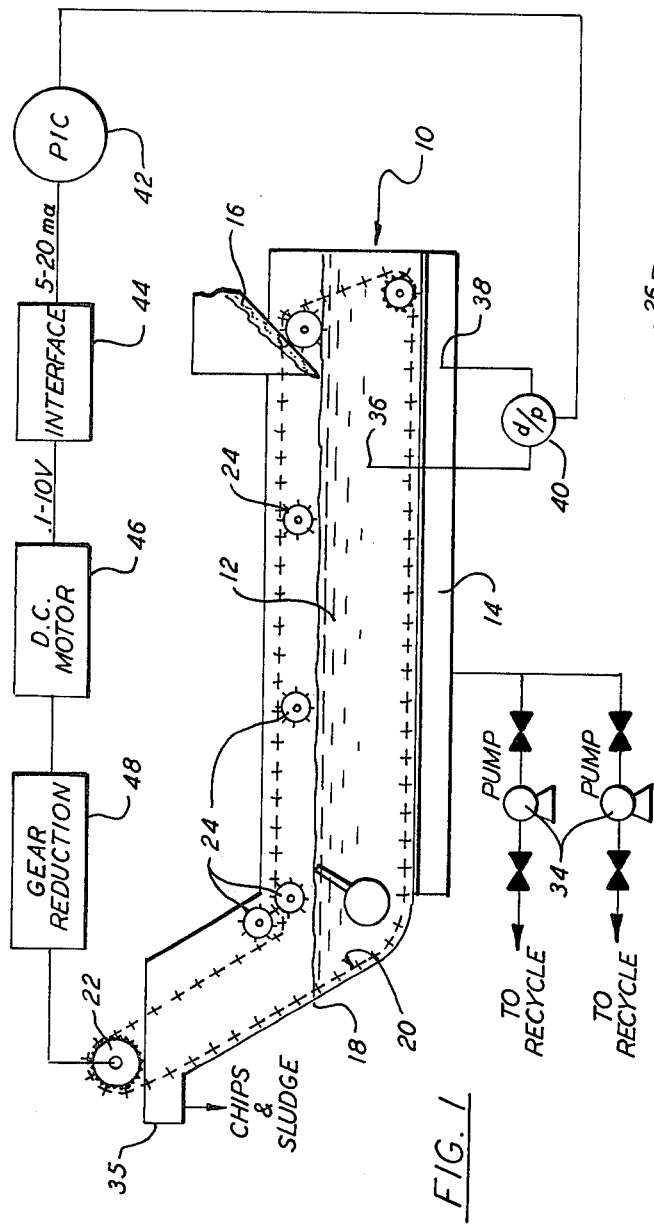
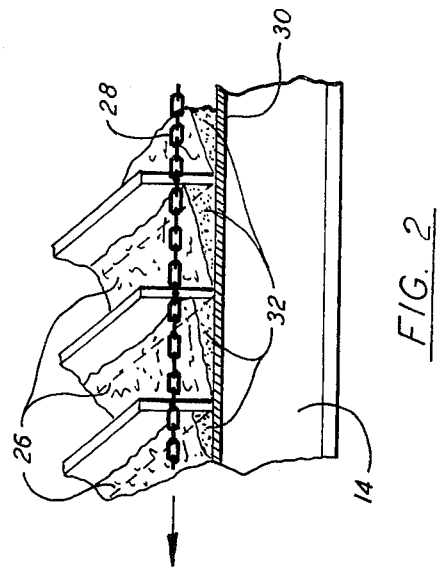
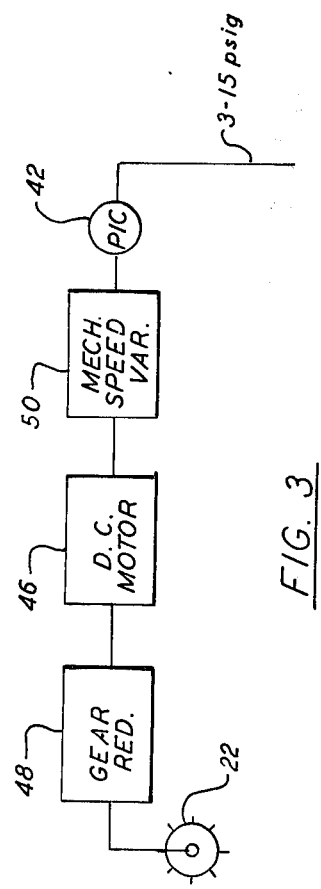

LIQUID FILTRATION SYSTEM

REFERENCE TO RELATED APPLICATION

This is a continuation-in-part of application Ser. No. 675,295, filed Apr. 9, 1976, by the same inventor, now abandoned.

BACKGROUND OF THE INVENTION

The present invention relates to liquid filtration processes and systems and, more particularly, to filtration processes and apparatus for removing both large, bulky and small, compactible solid contaminants from liquids used for cooling and/or lubricating purposes in metal machining operations, and the like.

It is a common practice to employ filtration systems in connection with metal machining operations using liquid coolants and lubricants. As the liquid carries away metal chips, turnings, and other materials from the work areas it must be clarified before being again pumped through the system. A basic form of apparatus used in such filtration processes comprises a settling tank with a porous filter material or screen separating an upper compartment, to which the contaminated liquid is delivered, from a lower compartment, into which the filtered or clean liquid drains. The filtration efficiency increases as small contaminants build up to form a bed on the surface of the filter since these contaminants also serve to block the flow of other solid materials in the liquid. However, as efficiency increases, the rate of flow of liquid from the contaminated to the clean compartment and the pressure within the clean compartment correspondingly decrease.

A drag conveyor having transverse flights contacting the upper surface of the filter element is commonly used to remove some of the collected contaminants when the rate of flow, usually as evidenced by the pressure differential between the upper and lower compartments, reaches a predetermined level. In typical installations, the conveyor is stationary until the sensing apparatus indicates that flow through the filter has decreased below the set point, at which time the drive mechanism is actuated to move the conveyor and thus remove contaminants from the filter element surface. When sufficient contaminants have been removed to restore the flow rate to a desired value, the conveyor is stopped and remains stationary until flow rate again decreases below the set point.

While such systems are effective to maintain automatically the flow rate of liquid from upper to lower compartment between predetermined maximum and minimum values, it is apparent that the flow rate and filtration efficiency will constantly fluctuate between these values. Thus, it is difficult to maintain a constant rate of withdrawal of clean liquid from the lower compartment and a constant degree of clarity of the filtered liquid thus requiring a second tank to maintain the balance of the flow. Another problem results from the fact that while certain of the contaminants are relatively small and compactible, thereby collecting on the upper surface of the filter element to form the so-called sludge bed, others are large and bulky. The latter are commonly curled metal turnings, having large bulk compared to their density and creating little resistance to the flow of liquid therethrough. Thus, the upper compartment may contain a large amount of turnings without decreasing flow rate (i.e., increasing pressure differential) to the point where the conveyor is indexed to remove the turnings. In fact, since filtration systems of this type may be rendered virtually inoperative due to the buildup of turnings in the upper compartment, a separate settling tank is commonly provided for removal of turnings and other such bulky contaminants prior to delivery of the liquid to the filtration tank. Obviously, this requires additional handling of the liquid, more space, more equipment and more time to effect purification of the liquid than a process which can be carried out in a single tank.

It is a principal object of the present invention to provide a process whereby both large, bulky and small, compactible contaminants are removed from a liquid in an automatic manner which maintains a substantially constant degree of liquid clarity.

A further object is to provide a process and apparatus for purifying and recycling liquid to a metal machining operation in a manner which minimizes the required energy, space, time and equipment.

Another object is to provide liquid filtration apparatus of the foregoing type having a desired, substantially constant filtration efficiency by maintaining a constant pressure differential across the filter and bed of accumulated contaminants.

In a more general sense, the object of the invention is to provide novel and improved filtration processes and apparatus for purifying liquid coolants used in metal working operations.

Other objects will in part be obvious and will in part appear hereinafter.

SUMMARY OF THE INVENTION

In accordance with the foregoing objects, the invention is designed primarily for employment in conjunction with a metal machining operation and, in particular, for an operation which generates metal turnings (i.e., relatively large and bulky contaminants) at a determinable volumetric rate. Liquid used in the machining operation carries away the turnings, as well as other contaminants, and is delivered to the upper compartment of a filtration tank having a lower compartment for receiving the filtered liquid. Contaminants are removed from the upper compartment at a variable rate which is always greater than zero. The minimum rate at which contaminants are removed is set to correspond to the aforementioned volumetric rate at which large, bulky contaminants are generated and delivered to the filtration tank. This rate is normally slow enough that smaller contaminants will still collect on the upper surface of the filter element to form a so-called sludge or filter bed.

The lower compartment is substantially vacuum tight, so that, as filtered liquid is pumped back to the machining operation, a negative (i.e., sub-atmospheric) pressure is developed on the lower side of the filter element. This pressure is proportional to filtration efficiency; that is, as the thickness of the sludge bed increases, the resistance to flow therethrough is likewise increased, requiring a greater negative pressure to draw the liquid through the sludge bed at a desired rate. The clarity of filtered liquid is, of course, greater as the thickness of the sludge bed increases. The negative pressure in the lower compartment is sensed and the rate of contaminant removal is modulated to maintain the thickness of the bed at a level providing a substantially constant degree of liquid clarity.

The apparatus of the invention comprises a tank separated into two compartments by a horizontally disposed wedgewire strainer, or similar type filter, through which liquid passes to a clean plenum. Metal chips, sludge, and other contaminants are deposited on the upper surface of the screen as the liquid passes therethrough and the smaller, more compactible contaminants build up to form a filter media for the other contaminated liquid in the upper compartment. The filtering efficiency, i.e., the size and percentage of particles initially contaminating the liquid which are retained in the upper compartment, is virtually a direct function of the pressure differential across the bed and screen.

A conventional drag conveyor has a lower reach passing through the bottom of the upper compartment with transverse flights dragging across the surface of the wedgewire strainer to scrape off accumulated chips and other contaminants. The conveyor passes up an inclined portion of the tank and discharges the contaminants scraped from the bottom. An electric motor powers a drive sprocket for moving the conveyor through the tank.

A differential pressure cell measures the pressure drop across the bed and screen, essentially the difference between atmospheric and the sub-atmospheric pressure in the clean liquid plenum, developing a signal proportional thereto which is applied to a pressure indicator controller. The output of the controller, in either electrical or pneumatic form, provides an input signal to a motor connected through an appropriate gear reduction to the drive sprocket of the drag conveyor. Thus, the speed of the motor, and of the conveyor, is proportional to the input signal, which in turn is commensurate with the pressure drop across the bed and filter. Accordingly, the rate at which contaminants are removed is continuously modulated to maintain a substantially constant filtration efficiency while never dropping below the rate required to remove large, bulky contaminants at the rate they are delivered to the tank.

BRIEF DESCRIPTION OF THE DRAWING

FIG. 1 is a diagrammatic illustration of the filtration system of the present invention, showing the tank in side sectional view;

FIG. 2 is a fragmentary, perspective view, also somewhat diagrammatic, of a portion of the apparatus of FIG. 1; and FIG. 3 is a diagrammatic showing of an alternate form of operation of a portion of the system of FIG. 1.

DETAILED DESCRIPTION

Referring now to the drawing, the filtration system comprises a tank of appropriate capacity, generally indicated by reference numeral 10, having upper compartment 12 and relatively smaller volume lower compartment 14. Tank 10, and associated structure, operates as described hereinafter to remove contaminants from liquid used in conventional manner for cooling and/or lubrication purposes in machining, or similar metal working operations at a separate work area (not shown). Contaminated liquid from the work area is delivered to tank 10 through trench 16 for discharge into upper compartment 12 at or near one end of tank 10, the other end of which is inclined to form apron 18. Drag conveyor 20 is formed in a continuous loop; passing around drive sprocket 22 and appropriately positioned idler sprockets 24. Conveyor 20 is constructed in conventional fashion and includes transverse steel flights 26 connected on each side by chains 28. As best seen in FIG. 2, flights 26 on the lower reach of the conveyor loop scrape across the bottom of upper compartment 12, at least a portion of which is formed of a perforate filter 30, preferably a conventional wedgewire screen of a type typically employed in such applications.

As liquid flows through filter 30 from the upper to the lower compartment of tank 10, chips, sludge, and other small, compactible contaminants accumulate on the upper surface of filter 30, to form a layer generally indicated by reference numeral 32. These contaminants will be fairly evenly distributed along the filter surface due to the hydraulic flow of fluid from the end of the tank at which it enters toward the other end, as well as by hydraulic flow through filter 30. The clean liquid in compartment 14 is drawn into the suction side of one or more pumps 34, for return to the work area. As flights 26 reach the top of apron 18, contaminants carried by the conveyor are discharged through chute 35.

Conventional pressure sensing means are arranged to measure the difference in pressure, on opposite sides of the bed of contaminants 32 and filter elements 30, as indicated in FIG. 1 at 36 and 38, respectively. Differential pressure cell 40, such as Differential Pressure Transmitter Model 1304TD 11111 by Taylor Instrument of Rochester, N.Y., is connected to the two pressure sensing points and develops a signal proportional in magnitude to the pressure differential. In the usual case, upper compartment 12 will be open to the atmosphere, whereby the pressure above bed 32 will be equal to atmospheric pressure, ignoring any effect of the head of liquid within the compartment. Lower compartment 14, however, is substantially vacuum tight so that a negative (i.e., subatmospheric) pressure may be maintained. Thus, the pressure differential may be indicated simply by sensing the negative pressure in compartment 14. The signal may be in electrical form, having a range of 5 to 20 milliamps, for example, to correspond to the range of pressure differentials which may be encountered in operation of the filtration system. Alternatively, the signal may be pneumatic form, having a range, for example, of 3-15 psig.

The signal developed by differential pressure cell 40 is applied to pressure indicator controller 42, e.g., Taylor Instrument Quik Scan Model 1312RA 10032, which has proportional and automatic reset modes of control. In the FIG. 1 construction, the signal is in electrical form and is applied to appropriate, conventional electrical interface 44 to convert the scale of the signal from the 5-20 milliamp level to a correspondingly variable signal is applied to an electric motor 46 as the drive signal to which the speed of the motor is proportional over an appropriate range. The motor is connected, through conventional gear reduction 48, to drive sprocket 22 of conveyor 20.

The FIG. 3 construction illustrates operation of the system with a pneumatic rather than an electrical signal. The physical construction of the tank and associated elements of the filtration system are the same as in the FIG. 1 construction, the only difference being that the signal from controller 42 is in pneumatic form. It is applied to the positioner of a mechanical speed varying mechanism 50 which drives motor 46 over, for example, a 10 to 1 speed range, which is adequate for all typical applications. Again, the motor output is connected to drive sprocket 22 through gear reduction 48.

The process of the invention is readily comprehended from the foregoing description of the structure and operation of the system. Implementation of the process includes determining the rate at which metal turnings are generated by the metal working operation in conjunction with which the invention functions. As previously stated, many machining operations produce turnings (defined herein as the relatively large, bulky, usually curly pieces of metal produced in common machining operations) at a reasonably constant, determinable rate. Thus, the rate of movement of conveyor required to remove the turnings at substantially the same rate at which they are supplied to compartment 12 may also be determined. The level of the signal which establishes the speed of the conveyor is set to have a minimum value which moves the conveyor at the determined rate. Therefore, bulky contaminants which may provide little or no resistance to flow through screen 30 will be removed from upper compartment 12 irrespective of the flow rate or the pressure differential. Smaller particles which settle by gravity and collect in a much more compact form than the turnings include metal chips, tramp oil, dirt and other forms of foreign matter which are supplied in the liquid at a generally random and indeterminable rate. The degree of buildup of such contaminants determines the relative ease with which the liquid may pass from the upper to the lower compartment and therefore the magnitude of the negative pressure developed in the lower compartment as liquid is pumped therefrom at a substantially constant rate. The speed of the conveyor is modulated to maintain this negative pressure at a substantially constant value, thereby establishing a substantially constant rate of liquid flow through the filter at a particular degree of liquid clarity.

From the foregoing it is apparent that the process is carried out within the constraints of two setpoints or control levels. One setpoint is established as a function of pressure in the lower compartment, being dependent solely upon the resistance to flow through the filter caused by contaminants in the upper compartment; the other setpoint is established as a function of the volumetric rate of supply of large, bulky contaminants to the upper compartment, being solely dependent upon this predetermined rate and completely independent of pressure. The net result is that the system operates to remove both large, bulky and small, compactible contaminants from a metal machining process liquid in a single filtration compartment with substantially constant filtration efficiency and no danger of clogging or other malfunction due to process limitations.

What is claimed is:

1. A filtration process for purifying contaminated liquid used in machining operations comprising:
   a. supplying contaminated liquid to an upper compartment of a filtration tank having a liquid permeable filter element separating said upper compartment from a substantially vacuum-tight lower compartment;
   b. said liquid containing both large, bulky contaminants which provide minimal resistance to flow of liquid through said filter element when deposited thereon, and small, compactible contaminants which provide resistance to flow of liquid through said filter element in proportion to the depth of the bed of said small contaminants deposited thereon;
   c. determining the volumetric rate at which said large contaminants are supplied to said upper compartment;
   d. pumping liquid from said lower compartment at a substantially constant rate;
   e. sensing the pressure within said second compartment;
   f. determining the pressure at which the flow of liquid through said filter element and bed of small contaminants produces a desired degree of clarity of the liquid in said second compartment;
   g. removing both said large and small contaminants from said upper compartment by power-driven means moving therethrough at a variable, automatically controlled speed;
   h. establishing a minimum speed at a value greater than zero sufficient to remove said large contaminants in accordance with the volumetric rate of supply thereof, irrespective of said pressure; and
   i. increasing the speed from said minimum value in response to a decrease of said pressure below that determined to provide said desired degree of clarity, irrespective of the rate of supply of said large contaminants.

2. The process according to claim 1 wherein said contaminants are removed by a drag conveyor moving through said upper compartment.

3. The process according to claim 2 wherein the speed of said power-driven means is established by the magnitude of an electrical signal having a minimum set point providing said minimum speed.

4. The process according to claim 2 wherein the speed of said power-driven means is established by the magnitude of a pneumatic signal having a minimum set point providing said minimum speed.

5. The process according to claim 1 wherein said contaminated liquid is supplied directly to said tank from said machining operation and all contaminant removal is performed entirely within a single tank.

6. A filtration system for removing from a liquid used in machining operations both large, bulky and small, compactible contaminants, at least the large, bulky contaminants being supplied in the liquid delivered to the system at a relatively constant, determinable volumetric rate, said system comprising, in combination:
   a. a single tank having an upper compartment adapted to receive contaminated liquid arranged directly above a substantially vacuum-tight lower compartment;
   b. a filter element separating said upper and lower compartments for drainage of liquid from the former to the latter with contaminants being retained in said upper compartment, the large contaminants presenting little resistance to flow of liquid through said filter element irrespective of the accumulation thereof and the small contaminants presenting a resistance to such flow proportional to the accumulation of small contaminants on said filter element;
   c. pump means for evacuating liquid from said lower compartment at a substantially constant rate, thereby creating a pressure differential between said upper and lower compartments having a magnitude proportional to the resistance to flow of liquid through said filter element and thereby to the depth of the bed of small contaminants thereon;
   d. movable, power-driven means for removing contaminants from said upper compartment;
   e. means for sensing said pressure differential; and
   f. control means establishing the speed of movement of said movable means, said control means having a first set point establishing the minimum speed of movement at a value greater than zero sufficient to remove large contaminants in accordance with said volumetric rate of supply thereof irrespective of said pressure differential and a second set point for increasing the speed of movement above said minimum value in response to increase of said pressure differential above a predetermined value, as determined by the accumulation of small contaminants on said filter element irrespective of the rate of supply of large contaminants.

7. The invention according to claim 6 wherein said control means further comprise means responsive to said pressure differential for developing an electrical signal having a magnitude directly proportional thereto, and means for driving said movable means at a speed directly proportional to said electrical signal.

8. The invention according to claim 6 wherein said control means further comprise means responsive to said pressure differential for developing a pneumatic signal having a magnitude directly proportional thereto, and means for driving said movable means at a speed directly proportional to said pneumatic signal.

* * * * *